US012640788B2

(12) United States Patent
Raghavan et al.

(10) Patent No.: US 12,640,788 B2
(45) Date of Patent: May 26, 2026

(54) BEAMFORMING INTERFERENCE MITIGATION SIGNALING

(71) Applicant: QUALCOMM Incorporated, San Diego, CA (US)

(72) Inventors: Vasanthan Raghavan, West Windsor Township, NJ (US); Yu-Chin Ou, San Diego, CA (US); Kobi Ravid, Closter, NJ (US); Mohammad Ali Tassoudji, San Diego, CA (US); Ozge Koymen, Princeton, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 18/057,999

(22) Filed: Nov. 22, 2022

(65) Prior Publication Data

US 2024/0171236 A1    May 23, 2024

(51) Int. Cl.
*H04B 7/06* (2006.01)
*H04B 17/336* (2015.01)
*H04L 5/00* (2006.01)

(52) U.S. Cl.
CPC ......... *H04B 7/0617* (2013.01); *H04B 17/336* (2015.01); *H04L 5/0051* (2013.01)

(58) Field of Classification Search
CPC ..... H04W 72/21; H04L 5/0005; H04L 5/0048
See application file for complete search history.

(56) References Cited

U.S. PATENT DOCUMENTS

| | | | | |
|---|---|---|---|---|
| 2007/0076783 A1* | 4/2007 | Dishman | .............. | H03G 3/3089 |
| | | | | 375/345 |
| 2013/0121185 A1* | 5/2013 | Li | ......................... | H04W 24/10 |
| | | | | 370/252 |
| 2016/0337916 A1* | 11/2016 | Deenoo | ................... | H04W 8/22 |
| 2019/0356524 A1* | 11/2019 | Yi | ....................... | H04L 27/2655 |
| 2020/0382967 A1* | 12/2020 | Yamada | ................ | H04W 16/28 |
| 2021/0045076 A1* | 2/2021 | Tomeba | .............. | H04W 56/001 |
| 2021/0099847 A1* | 4/2021 | Uchiyama | ............. | H04W 72/04 |
| 2021/0329473 A1* | 10/2021 | Zhang | .................. | H04B 7/0696 |
| 2022/0007207 A1* | 1/2022 | Raghavan | ........... | H04W 56/001 |
| 2022/0021427 A1 | 1/2022 | Mirzaee et al. | | |

OTHER PUBLICATIONS

International Search Report and Written Opinion—PCT/US2023/078808—ISA/EPO—Mar. 15, 2024.

* cited by examiner

*Primary Examiner* — Tejis Daya
(74) *Attorney, Agent, or Firm* — Dinsmore & Shohl LLP

(57) ABSTRACT

Various aspects of the present disclosure generally relate to wireless communication. In some aspects, a user equipment (UE) may receive an indication of an interference threshold for interference caused by beamforming at the UE. The UE may transmit a signal using a beam with an interference value that satisfies the interference threshold. Numerous other aspects are described.

18 Claims, 11 Drawing Sheets

700 —→

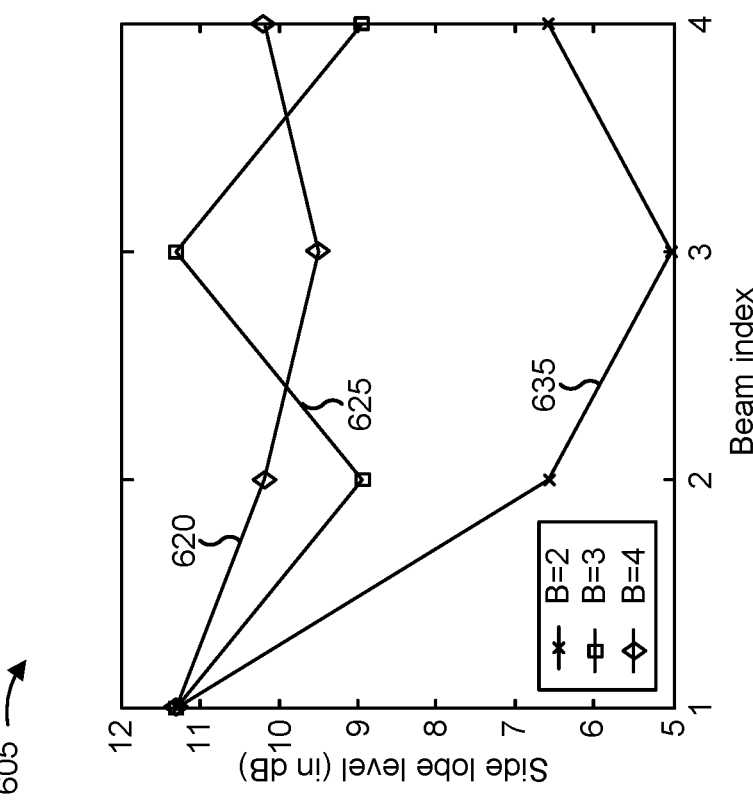
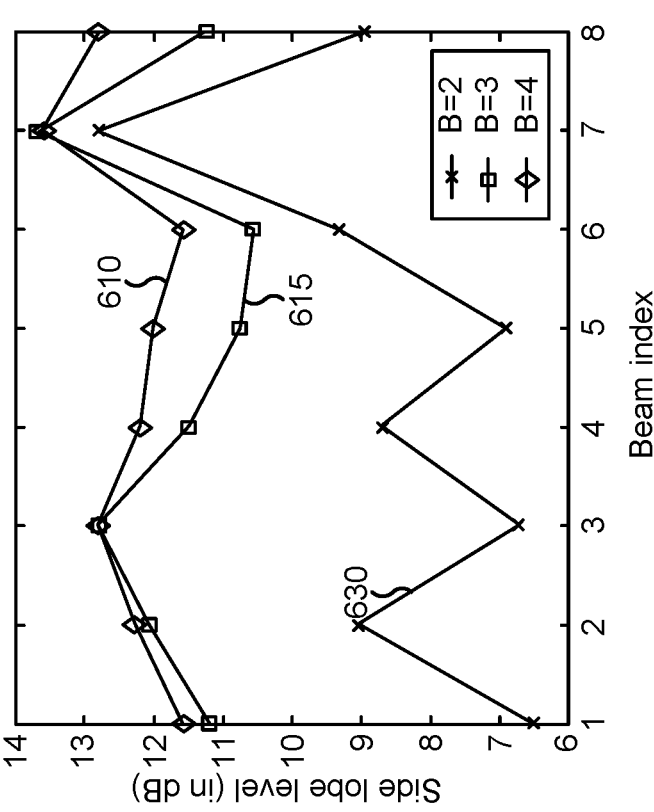
FIG. 6

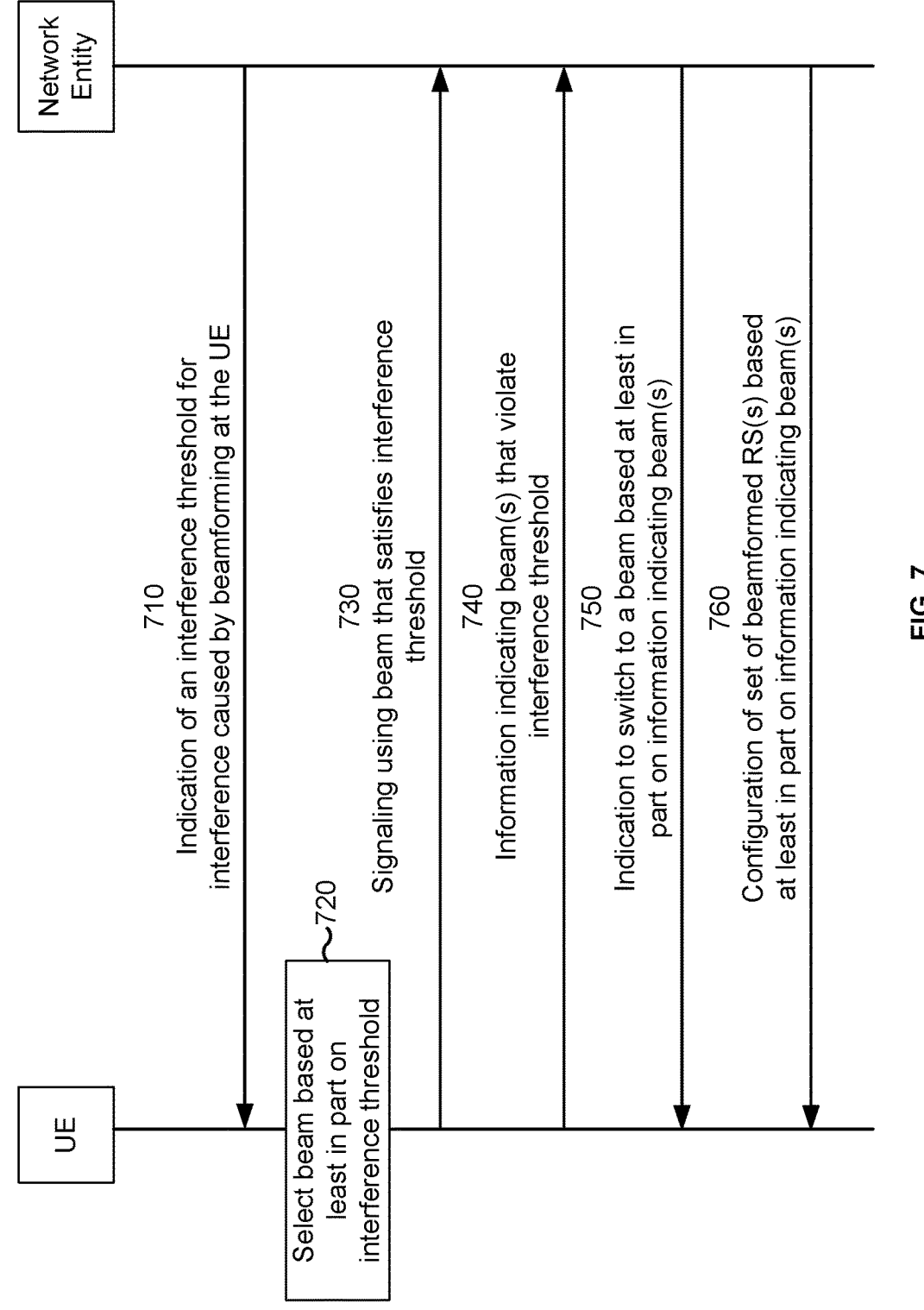

Network Entity

UE

710
Indication of an interference threshold for interference caused by beamforming at the UE

720

Select beam based at least in part on interference threshold

730
Signaling using beam that satisfies interference threshold

740
Information indicating beam(s) that violate interference threshold

750
Indication to switch to a beam based at least in part on information indicating beam(s)

760
Configuration of set of beamformed RS(s) based at least in part on information indicating beam(s)

Receive an indication of an interference threshold for interference caused by beamforming at the UE

810

Transmit a signal using a beam with an interference value that satisfies the interference threshold

820

800

Identify an interference threshold for interference caused by beamforming at a user equipment (UE)

910

Output an indication of the interference threshold for the interference caused by beamforming at the UE

920

900

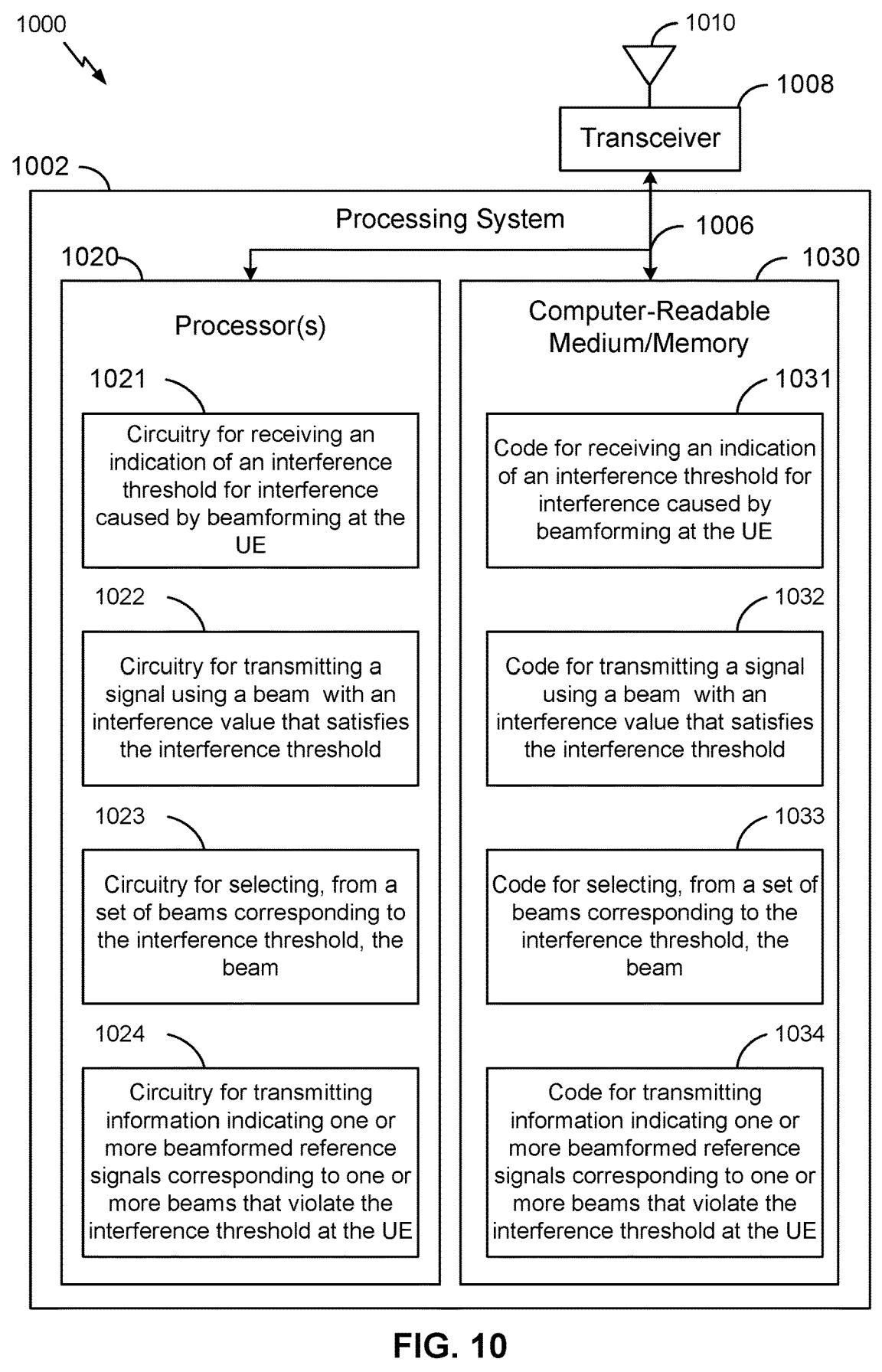

1000

1010

1008

Transceiver

1002

Processing System

1006

1020

Processor(s)

1030

Computer-Readable
Medium/Memory

1021

Circuitry for receiving an
indication of an interference
threshold for interference
caused by beamforming at the
UE

1031

Code for receiving an indication
of an interference threshold for
interference caused by
beamforming at the UE

1022

Circuitry for transmitting a
signal using a beam  with an
interference value that satisfies
the interference threshold

1032

Code for transmitting a signal
using a beam  with an
interference value that satisfies
the interference threshold

1023

Circuitry for selecting, from a
set of beams corresponding to
the interference threshold, the
beam

1033

Code for selecting, from a set of
beams corresponding to the
interference threshold, the
beam

1024

Circuitry for transmitting
information indicating one or
more beamformed reference
signals corresponding to one or
more beams that violate the
interference threshold at the UE

1034

Code for transmitting
information indicating one or
more beamformed reference
signals corresponding to one or
more beams that violate the
interference threshold at the UE

FIG. 10

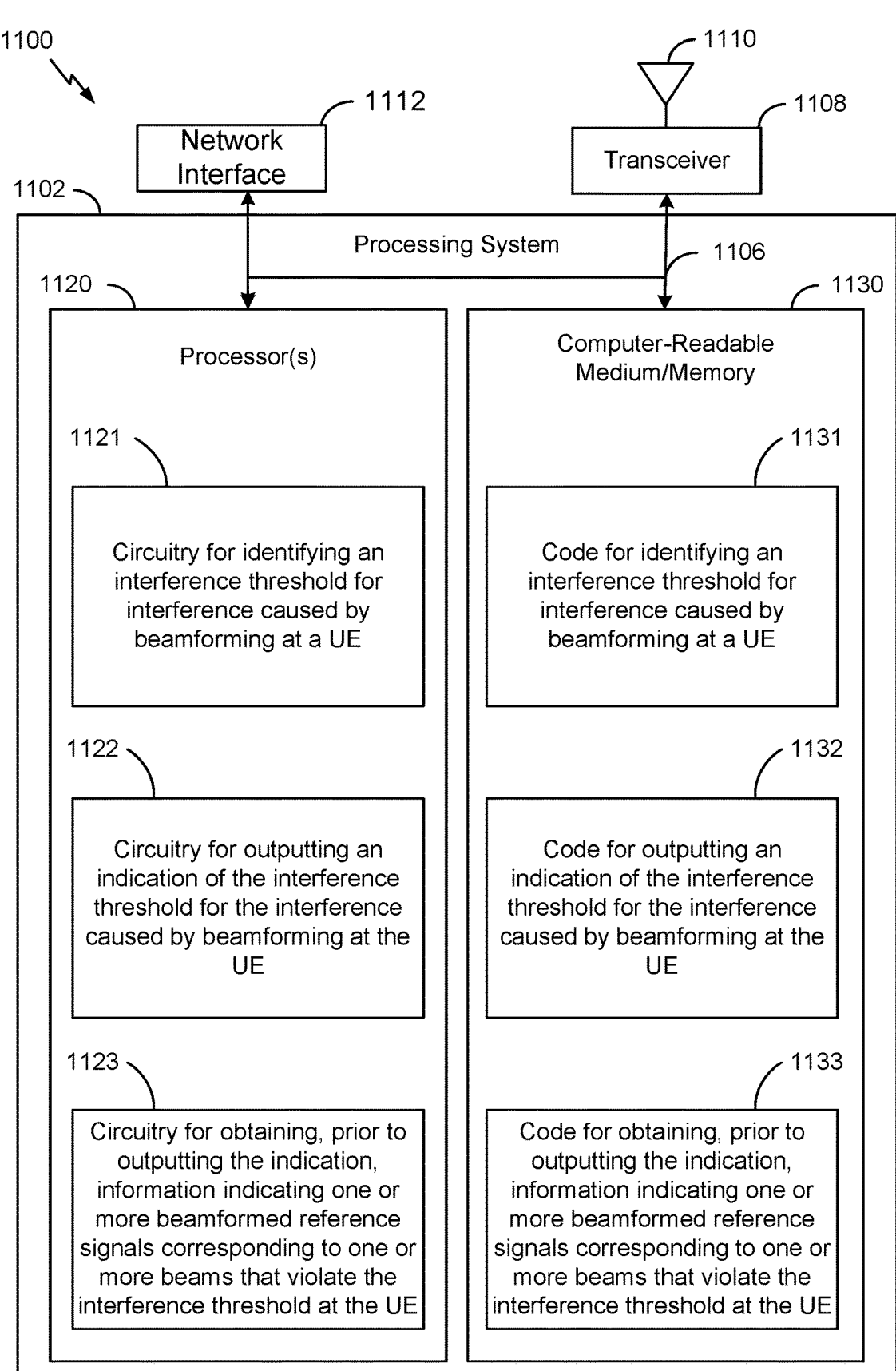

1100

1110

1112

Network Interface

1108

Transceiver

1102

Processing System

1106

1120

Processor(s)

1130

Computer-Readable Medium/Memory

1121

Circuitry for identifying an interference threshold for interference caused by beamforming at a UE

1131

Code for identifying an interference threshold for interference caused by beamforming at a UE

1122

Circuitry for outputting an indication of the interference threshold for the interference caused by beamforming at the UE

1132

Code for outputting an indication of the interference threshold for the interference caused by beamforming at the UE

1123

Circuitry for obtaining, prior to outputting the indication, information indicating one or more beamformed reference signals corresponding to one or more beams that violate the interference threshold at the UE

1133

Code for obtaining, prior to outputting the indication, information indicating one or more beamformed reference signals corresponding to one or more beams that violate the interference threshold at the UE

FIG. 11

BEAMFORMING INTERFERENCE MITIGATION SIGNALING

FIELD OF THE DISCLOSURE

Aspects of the present disclosure generally relate to wireless communication and to techniques and apparatuses for beamforming interference mitigation signaling.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving an indication of an interference threshold for interference caused by beamforming at the UE. The method further includes transmitting a signal using a beam with an interference value that satisfies the interference threshold.

Another aspect provides a method for wireless communication by a network entity. The method includes identifying an interference threshold for interference caused by beamforming at a UE. The method further includes outputting an indication of the interference threshold for the interference caused by beamforming at the UE.

Other aspects provide: an apparatus operable, configured, or otherwise adapted to perform any one or more of the aforementioned methods and/or those described herein with reference to and as illustrated by the drawings; a non-transitory, computer-readable media comprising instructions that, when executed by a processor of an apparatus, cause the apparatus to perform the aforementioned methods as well as those described herein with reference to and as illustrated by the drawings; a computer program product embodied on a computer-readable storage medium comprising code for performing the aforementioned methods as well as those described herein with reference to and as illustrated by the drawings; and/or an apparatus comprising means for performing the aforementioned methods. as well as those described herein with reference to and as illustrated by the drawings. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating examples of differences between main lobe gain and side lobe gain at different phase shifter resolutions, in accordance with the present disclosure.

FIG. 7 is a diagram illustrating an example of beamforming interference mitigation signaling, in accordance with the present disclosure.

FIG. 10 depicts aspects of an example communications device, in accordance with the present disclosure.

FIG. 11 depicts aspects of an example communications device, in accordance with the present disclosure.

DETAILED DESCRIPTION

Figure 1:
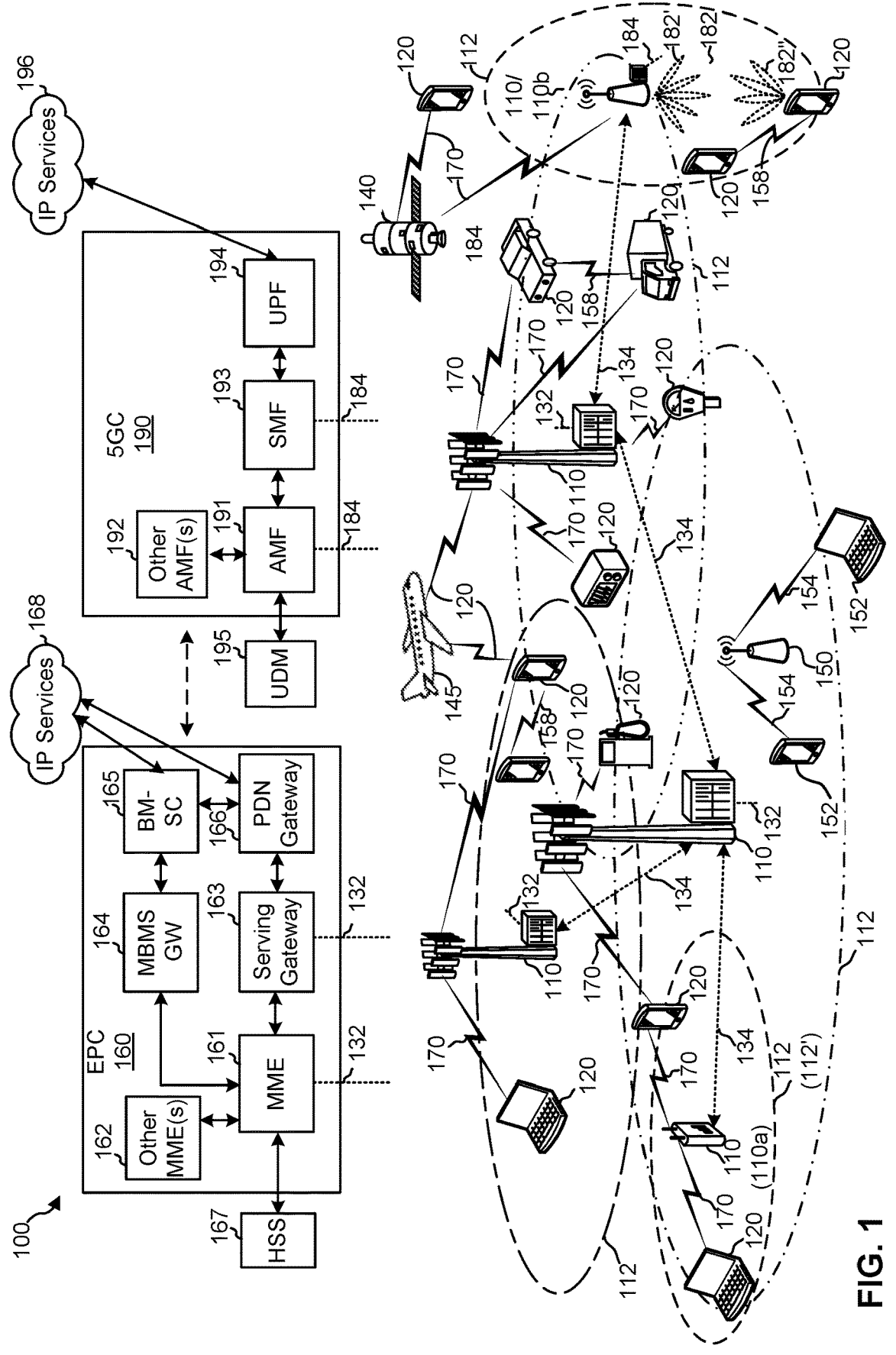
FIG. 1 depicts an example of a wireless communications network, in accordance with the present disclosure.

Aspects of the present disclosure provide apparatuses, methods, processing systems, and computer-readable mediums for beamforming interference mitigation signaling.

A wireless communication device such as a UE may generate beams (e.g., transmission beams and/or reception beams) to improve communication performance, particularly in frequency ranges that are subject to significant fading and attenuation due to path loss, blockage, etc. (e.g., FR2 frequencies and beyond). FR2 may include the frequency range of 24,250 MHz-52,600 MHz, which is sometimes referred to (interchangeably) as a "millimeter wave" ("mmW" or "mmWave"). For example, beam weights can be used in mmWave systems (and beyond) for directional energy generation and beam steering. A beam may have one or more side lobes, depending on the physical properties and configuration of components used to generate the beam, such as an antenna array and a set of phase shifters associated with the antenna array. A transmission using a beam may cause Interference at devices that are within a coverage area of a side lobe of the beam generated for transmissions. It may be advantageous to implement low-resolution phase shifters and small antenna arrays (e.g., including a relatively low number of phase shifting states and/or antenna elements). However, low-resolution phase shifters and small antenna arrays may be associated with increased interference and stronger side lobes relative to higher-resolution phase shifters, as described below.

Given a certain phase shifter resolution (or number of phase shifting states) and array size, some beams have stronger side lobes than other beams. From the network's perspective (or other UEs accessing a network), a strong side lobe can cause interference, particularly in dense networks and scenarios where beams are not coordinated across cells. This side lobe-induced interference is particularly problematic considering the adoption of low-resolution phase shifters and small antenna arrays, which may generally cause more powerful side lobes than high-resolution phase shifters and large antenna arrays. Using a beam, at a UE (or other wireless communication device), associated with a strong side lobe may cause interference and reduced efficiency of network communications.

Some techniques described herein provide selection of, and transmission using, a beam that satisfies an interference threshold for interference caused by beamforming at a UE. The interference threshold may be based on a difference between a side lobe and a main lobe of a beam. For example, a beam that violates the interference threshold may have a side lobe with a gain (e.g., a peak gain) that is within X dB of a main lobe of the beam. The UE may select a beam from a set of beams that do not violate the interference threshold. In some aspects, the interference threshold may be signaled by a network entity. For example, the network entity may determine the interference threshold, as described elsewhere herein, and may provide an indication of the interference threshold to the UE. By transmitting using a beam that satisfies the interference threshold, interference is reduced and efficiency of network communications is improved. Thus, the viability of low-complexity devices, such as devices incorporating low-resolution phase shifters and/or limited numbers of antenna elements in the antenna array, is improved.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) device, always on (AON) device, edge processing device, or another similar device. A UE 120 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

BSs 110 may generally include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT)

Figure 3:
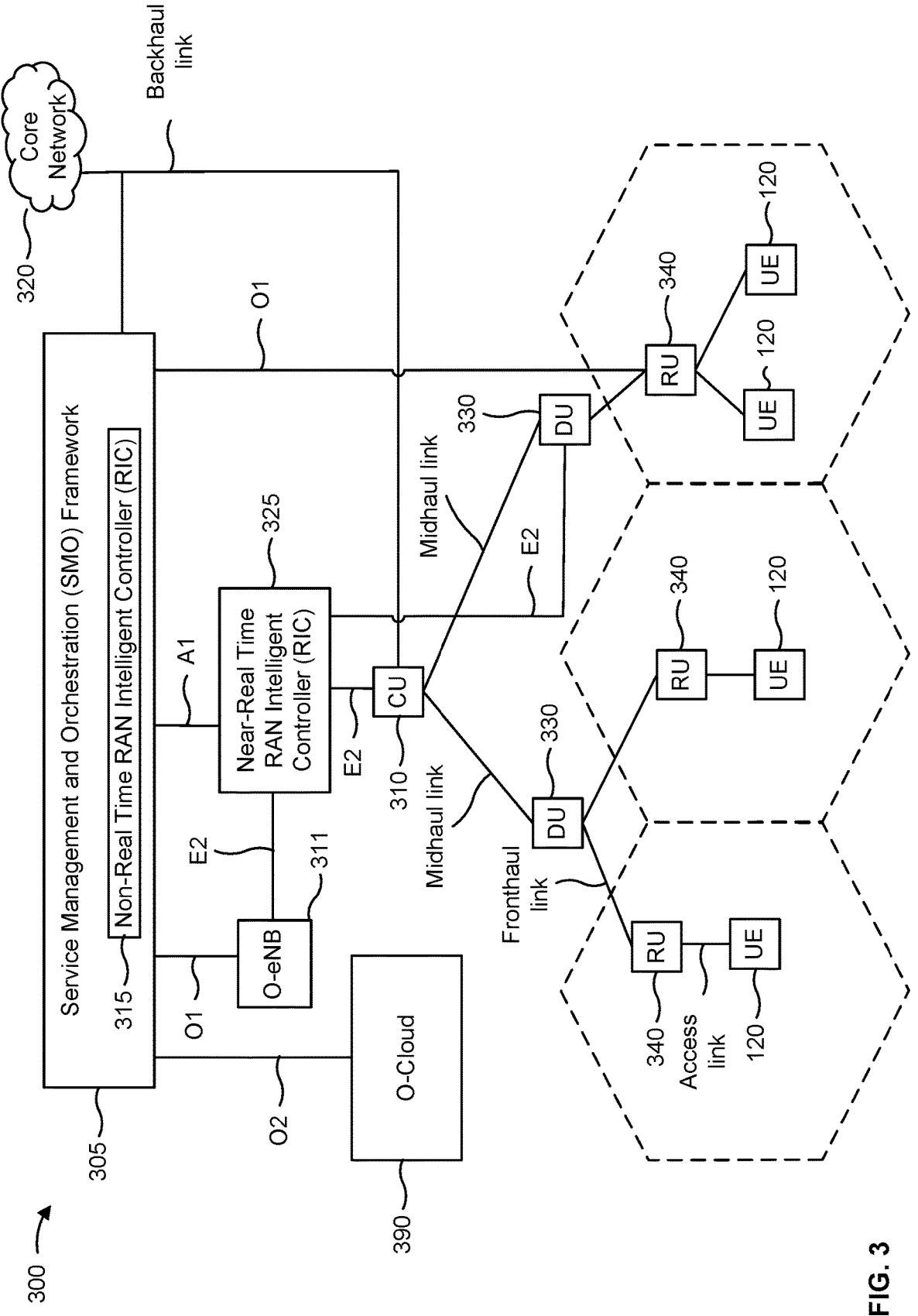
FIG. 3 depicts an example disaggregated base station architecture, in accordance with the present disclosure.

RAN Intelligent Controller (RIC), or a Non-Real Time (Non-RT) RIC, to name a few examples. In another example, various aspects of a base station may be virtualized. More generally, a base station (e.g., BS 110) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 3 depicts and describes an example disaggregated base station architecture.

Different BSs 110 within wireless communications network 100 may also be configured to support different radio access technologies, such as 3G, 4G, and/or 5G. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110b) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110b in FIG. 1) may utilize beamforming with a UE 120 to improve path loss and range, as shown at 182. For example, BS 110b and the UE 120 may each include a plurality of antennas, such as antenna elements, antenna panels, and/or antenna arrays to facilitate the beamforming. In some cases, BS 110b may transmit a beamformed signal to UE 120 in one or more transmit directions 182'. UE 120 may receive the beamformed signal from the BS 110*b* in one or more receive directions 182". UE 120 may also transmit a beamformed signal to the BS 110*b* in one or more transmit directions 182". BS 110*b* may also receive the beamformed signal from UE 120 in one or more receive directions 182'. BS 110*b* and UE 120 may then perform beam training to determine the best receive and transmit directions for each of BS 110*b* and UE 120. Notably, the transmit and receive directions for BS 110*b* may or may not be the same. Similarly, the transmit and receive directions for UE 120 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMES 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is the control node that processes the signaling between the UEs 120 and the EPC 160. Generally, MME 161 provides bearer and connection management.

Generally, user Internet protocol (IP) packets are transferred through Serving Gateway 163, which itself is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may be used to distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, or a transmission reception point (TRP), to name a few examples.

As indicated above, FIG. 1 is provided as an example. Other examples may differ from what is described with regard to FIG. 1.

Figure 2:
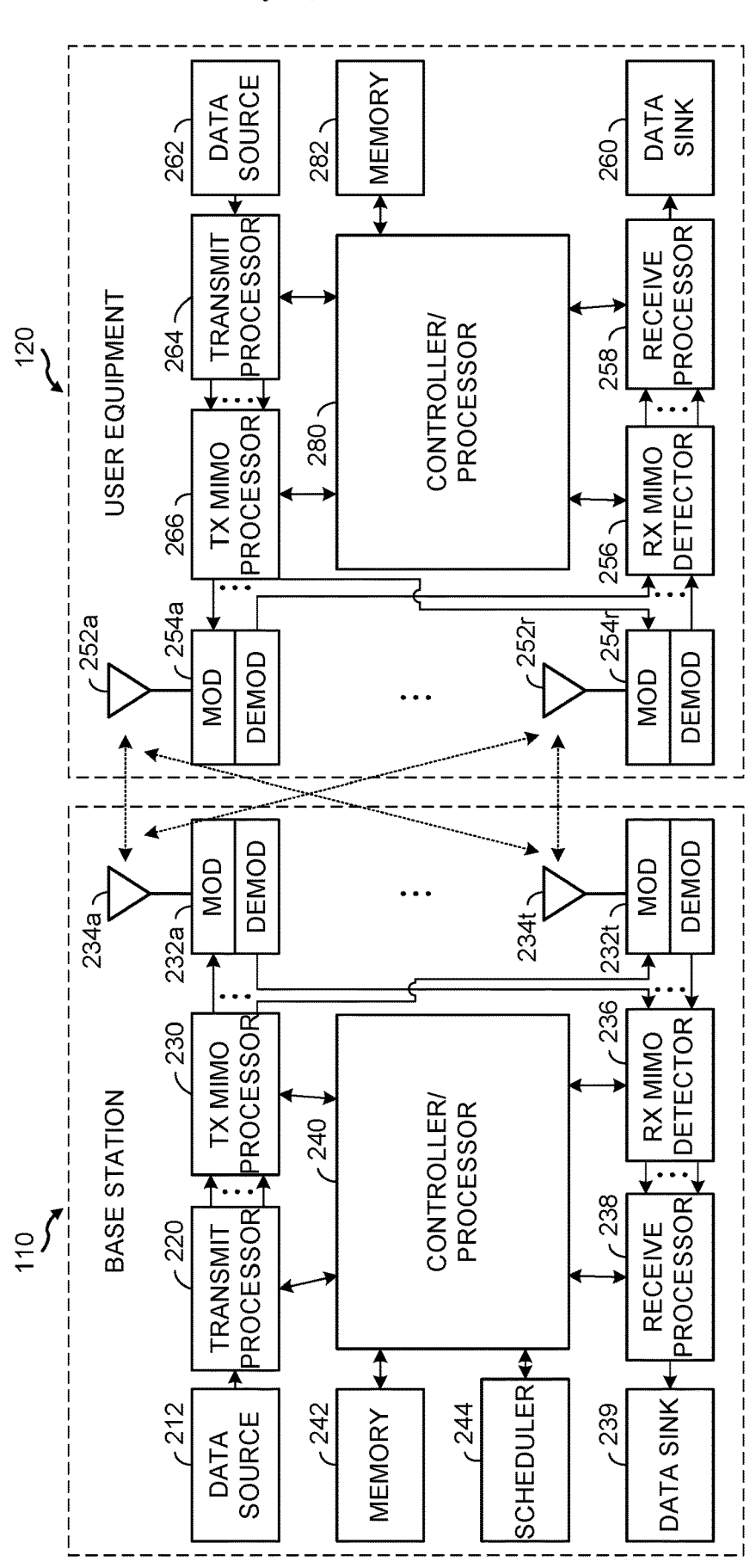
FIG. 2 depicts aspects of an example BS and UE, in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

In regard to an example downlink transmission, BS 110 includes a transmit processor 220 that may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), and/or others. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a-232t*. Each modulator in transceivers 232*a-232t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a-232t* may be transmitted via the antennas 234*a-234t*, respectively.

In order to receive the downlink transmission, UE 120 includes antennas 252*a-252r* that may receive the downlink signals from the BS 110 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

In regard to an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for single carrier frequency division multiplexing (SC-FDM)), and transmitted to BS 110.

At BS 110, the uplink signals from UE 120 may be received by antennas 234a-t, processed by the demodulators in transceivers 232a-232t, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, RX MIMO detector 236, controller/processor 240, receive processor 238, scheduler 244, memory 242, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) MC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT MC 315 or the Near-RT RIC 325 may be configured to tune RAN behavior or performance. For example, the Non-RT MC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figures 4A, 4B, 4C, 4D:
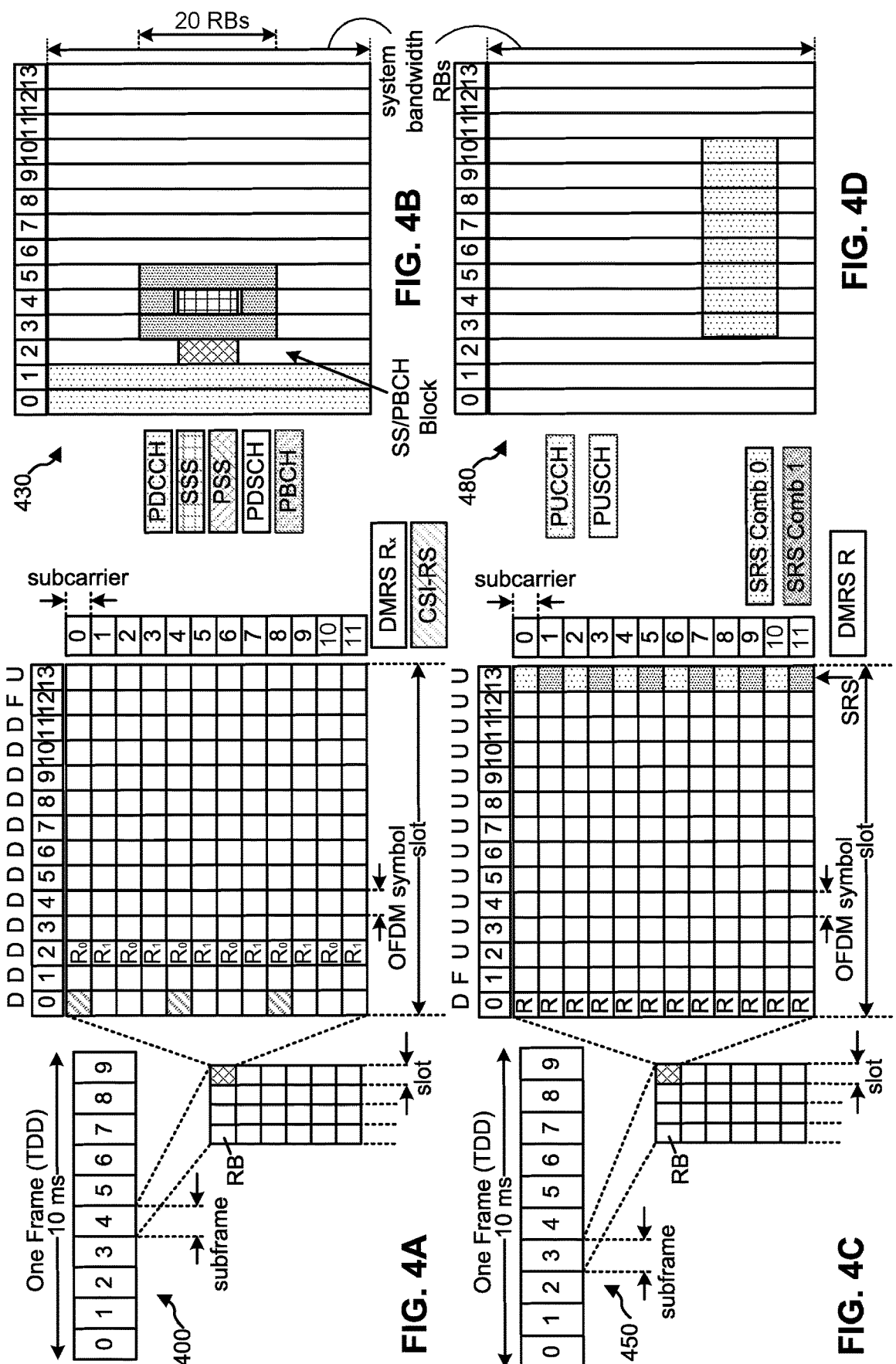
FIGS. 4A, 4B, 4C, and 4D depict aspects of data structures for a wireless communications network, such as wireless communications network of FIG. 1, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include demodulation RSs (DMRSs) and/or channel state information reference signals (CSI-RSs) for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., UE 120) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit sounding reference signals (SRSs). The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
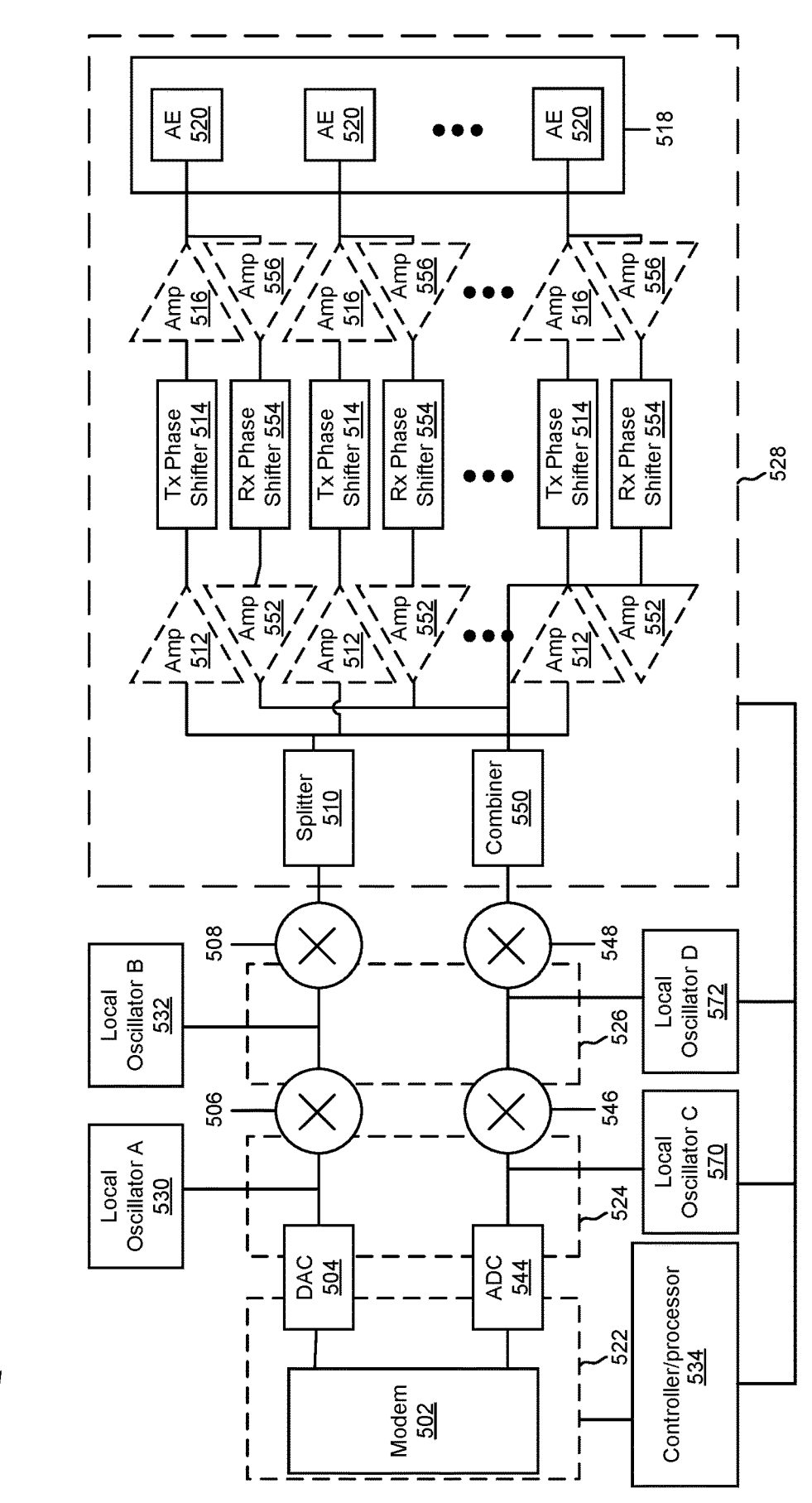
FIG. 5 is a diagram illustrating an example beamforming architecture that supports beamforming for millimeter wave (mmW) communications, in accordance with the present disclosure.

FIG. 5 is a diagram illustrating an example beamforming architecture 500 that supports beamforming for millimeter wave (mmW) communications, in accordance with the present disclosure. In some aspects, architecture 500 may implement aspects of wireless communications network 100. In some aspects, architecture 500 may be implemented in a transmitting device (e.g., a first wireless communication device, UE, or network node) and/or a receiving device (e.g., a second wireless communication device, UE, or network node), as described herein.

Broadly, FIG. 5 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 500 includes a modem (modulator/demodulator) 502, a digital to analog converter (DAC) 504, a first mixer 506, a second mixer 508, and a splitter 510. The architecture 500 also includes multiple first amplifiers 512, multiple phase shifters 514, multiple second amplifiers 516, and an antenna array 518 that includes multiple antenna elements 520. In some examples, the modem 502 may be one or more of the modems 232 or modems 254 described in connection with FIG. 2.

Transmission lines or other waveguides, wires, and/or traces are shown connecting the various components to illustrate how signals to be transmitted may travel between components. Reference numbers 522, 524, 526, and 528 indicate regions in the architecture 500 in which different types of signals travel or are processed. Specifically, reference number 522 indicates a region in which digital baseband signals travel or are processed, reference number 524 indicates a region in which analog baseband signals travel or are processed, reference number 526 indicates a region in which analog intermediate frequency (IF) signals travel or are processed, and reference number 528 indicates a region in which analog radio frequency (RF) signals travel or are processed. The architecture also includes a local oscillator A 530, a local oscillator B 532, and a controller/processor 534. In some aspects, controller/processor 534 corresponds to controller/processor 240 of the BS 110 described above in connection with FIG. 2 and/or controller/processor 280 of the UE 120 described above in connection with FIG. 2.

Each of the antenna elements 520 may include one or more sub-elements for radiating or receiving RF signals. For example, a single antenna element 520 may include a first sub-element cross-polarized with a second sub-element that can be used to independently transmit cross-polarized signals. The antenna elements 520 may include patch antennas, dipole antennas, or other types of antennas arranged in a linear pattern, a two dimensional pattern, or another pattern. A spacing between antenna elements 520 may be such that signals with a desired wavelength transmitted separately by the antenna elements 520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 520 to allow for interaction or interference of signals transmitted by the separate antenna elements 520 within that expected range.

The modem 502 processes and generates digital baseband signals and may also control operation of the DAC 504, first and second mixers 506, 508, splitter 510, first amplifiers

512, phase shifters 514, and/or the second amplifiers 516 to transmit signals via one or more or all of the antenna elements 520. The modem 502 may process signals and control operation in accordance with a communication standard such as a wireless standard discussed herein. The DAC 504 may convert digital baseband signals received from the modem 502 (and that are to be transmitted) into analog baseband signals. The first mixer 506 upconverts analog baseband signals to analog IF signals within an IF using a local oscillator A 530. For example, the first mixer 506 may mix the signals with an oscillating signal generated by the local oscillator A 530 to "move" the baseband analog signals to the IF. In some cases, some processing or filtering (not shown) may take place at the IF. The second mixer 508 upconverts the analog IF signals to analog RF signals using the local oscillator B 532. Similar to the first mixer, the second mixer 508 may mix the signals with an oscillating signal generated by the local oscillator B 532 to "move" the IF analog signals to the RF or the frequency at which signals will be transmitted or received. The modem 502 and/or the controller/processor 534 may adjust the frequency of local oscillator A 530 and/or the local oscillator B 532 so that a desired IF and/or RF frequency is produced and used to facilitate processing and transmission of a signal within a desired bandwidth.

In the illustrated architecture 500, signals upconverted by the second mixer 508 are split or duplicated into multiple signals by the splitter 510. The splitter 510 in architecture 500 splits the RF signal into multiple identical or nearly identical RF signals. In other examples, the split may take place with any type of signal, including with baseband digital, baseband analog, or IF analog signals. Each of these signals may correspond to an antenna element 520, and the signal travels through and is processed by amplifiers 512, 516, phase shifters 514, and/or other elements corresponding to the respective antenna element 520 to be provided to and transmitted by the corresponding antenna element 520 of the antenna array 518. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to power supply and the RF signals exiting the splitter 510 may be at a power level lower than the RF signal entering the splitter 510.

After being split by the splitter 510, the resulting RF signals may enter an amplifier, such as a first amplifier 512, or a phase shifter 514 corresponding to an antenna element 520. The first and second amplifiers 512, 516 are illustrated with dashed lines because one or both of them might not be necessary in some aspects. In some aspects, both the first amplifier 512 and second amplifier 516 are present. In some aspects, neither the first amplifier 512 nor the second amplifier 516 is present. In some aspects, one of the two amplifiers 512, 516 is present but not the other. By way of example, if the splitter 510 is an active splitter, the first amplifier 512 may not be used. By way of further example, if the phase shifter 514 is an active phase shifter that can provide a gain, the second amplifier 516 might not be used.

The amplifiers 512, 516 may provide a desired level of positive or negative gain. A positive gain (positive in the dB scale) may be used to increase an amplitude of a signal for radiation by a specific antenna element 520. A negative gain (negative in the dB scale) may be used to decrease an amplitude and/or suppress radiation of the signal by a specific antenna element. Each of the amplifiers 512, 516 may be controlled independently (e.g., by the modem 502 or the controller/processor 534) to provide independent control of the gain for each antenna element 520. For example, the modem 502 and/or the controller/processor 534 may have at least one control line connected to each of the splitter 510, first amplifiers 512, phase shifters 514, and/or second amplifiers 516 that may be used to configure a gain to provide a desired amount of gain for each component and thus each antenna element 520.

The phase shifter 514 may provide a configurable phase shift or phase offset to a corresponding RF signal to be transmitted. The phase shifter 514 may be a passive phase shifter not directly connected to a power supply. Passive phase shifters might introduce some insertion loss. The second amplifier 516 may boost the signal to compensate for the insertion loss. The phase shifter 514 may be an active phase shifter connected to a power supply such that the active phase shifter provides some amount of gain or prevents insertion loss. The settings of each of the phase shifters 514 are independent, meaning that each can be independently set to provide a desired amount of phase shift or the same amount of phase shift or some other configuration. The modem 502 and/or the controller/processor 534 may have at least one control line connected to each of the phase shifters 514 and which may be used to configure the phase shifters 514 to provide a desired amount of phase shift or phase offset between antenna elements 520.

In the illustrated architecture 500, RF signals received by the antenna elements 520 are provided to one or more first amplifiers 556 to boost the signal strength. The first amplifiers 556 may be connected to the same antenna arrays 518 (e.g., for time division duplex (TDD) operations). The first amplifiers 556 may be connected to different antenna arrays 518. The boosted RF signal is input into one or more phase shifters 554 to provide a configurable phase shift or phase offset for the corresponding received RF signal to enable reception via one or more Rx beams. The phase shifter 554 may be an active phase shifter or a passive phase shifter. The settings of the phase shifters 554 are independent, meaning that each can be independently set to provide a desired amount of phase shift or the same amount of phase shift or some other configuration. The modem 502 and/or the controller/processor 534 may have at least one control line connected to each of the phase shifters 554 and which may be used to configure the phase shifters 554 to provide a desired amount of phase shift or phase offset between antenna elements 520 to enable reception via one or more Rx beams.

The outputs of the phase shifters 554 may be input to one or more second amplifiers 552 for signal amplification of the phase shifted received RF signals. The second amplifiers 552 may be individually configured to provide a configured amount of gain. The second amplifiers 552 may be individually configured to provide an amount of gain to ensure that the signals input to combiner 550 have the same magnitude. The amplifiers 552 and/or 556 are illustrated in dashed lines because they might not be necessary in some aspects. In some aspects, both the amplifier 552 and the amplifier 556 are present. In another aspect, neither the amplifier 552 nor the amplifier 556 are present. In other aspects, one of the amplifiers 552, 556 is present but not the other.

In the illustrated architecture 500, signals output by the phase shifters 554 (via the amplifiers 552 when present) are combined in combiner 550. The combiner 550 in architecture 500 combines the RF signal into a signal. The combiner 550 may be a passive combiner (e.g., not connected to a power source), which may result in some insertion loss. The combiner 550 may be an active combiner (e.g., connected to a power source), which may result in some signal gain. When combiner 550 is an active combiner, it may provide a different (e.g., configurable) amount of gain for each input signal so that the input signals have the same magnitude when they are combined. When combiner 550 is an active combiner, the combiner 550 may not need the second amplifier 552 because the active combiner may provide the signal amplification.

The output of the combiner 550 is input into mixers 548 and 546. Mixers 548 and 546 generally down convert the received RF signal using inputs from local oscillators 572 and 570, respectively, to create intermediate or baseband signals that carry the encoded and modulated information. The output of the mixers 548 and 546 are input into an analog-to-digital converter (ADC) 544 for conversion to digital signals. The digital signals output from ADC 544 are input to modem 502 for baseband processing, such as decoding, de-interleaving, or similar operations.

The architecture 500 is given by way of example only to illustrate an architecture for transmitting and/or receiving signals. In some cases, the architecture 500 and/or each portion of the architecture 500 may be repeated multiple times within an architecture to accommodate or provide an arbitrary number of RF chains, antenna elements, and/or antenna panels. Furthermore, numerous alternate architectures are possible and contemplated. For example, although only a single antenna array 518 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 522, 524, 526, 528) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 510, amplifiers 512, 516, or phase shifters 514 may be located between the DAC 504 and the first mixer 506 or between the first mixer 506 and the second mixer 508. In one example, the functions of one or more of the components may be combined into one component. For example, the phase shifters 514 may perform amplification to include or replace the first and/or or second amplifiers 512, 516. By way of another example, a phase shift may be implemented by the second mixer 508 to obviate the need for a separate phase shifter 514. This technique is sometimes called local oscillator (LO) phase shifting. In some aspects of this configuration, there may be multiple IF to RF mixers (e.g., for each antenna element chain) within the second mixer 508, and the local oscillator B 532 may supply different local oscillator signals (with different phase offsets) to each IF to RF mixer.

The modem 502 and/or the controller/processor 534 may control one or more of the other components 504 through 572 to select one or more antenna elements 520 and/or to form beams for transmission of one or more signals. For example, the antenna elements 520 may be individually selected or deselected for transmission of a signal (or signals) by controlling an amplitude of one or more corresponding amplifiers, such as the first amplifiers 512 and/or the second amplifiers 516. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 520, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 518) can be dynamically controlled by modifying the phase shifts or phase offsets imparted by the phase shifters 514 and amplitudes imparted by the amplifiers 512, 516 of the multiple signals relative to each other. The controller/processor 534 may be located partially or fully within one or more other components of the architecture 500. For example, the controller/processor 534 may be located within the modem 502 in some aspects.

Beam weights (e.g., discrete Fourier transform (DFT) beam weights) can be used in mmWave systems (and beyond) for directional beam steering. Such beam weights have predictable/theoretical beam properties (assuming infinite-bit phase shifting resolution and a constant inter-antenna-element spacing for a uniformly spaced array, as described below), including a peak array gain of $10 \log_{10}(N)$ dB, a first side lobe delta of ~13.2 dB relative to a main lobe of a beam, and a 3-dB beamwidth of the main lobe of ~100/N degrees, where N is the array dimension. The side lobe delta indicates a difference between a gain (e.g., a peak gain) of the main lobe and a gain (e.g., a peak gain) of the side lobe. The array dimension may include a value indicating how many antenna elements are in an antenna array 518 generating a beam.

A phase shifter 514 may be characterized by a resolution. A resolution of a phase shifter 514 indicates a number of phase shifts that can be applied to an input signal by the phase shifter 514. A resolution can be characterized by a number of bits, represented by B. A B-bit phase shifter 514 may be capable of applying 2 B phase shifts to an input signal based on beam weights (e.g., DFT beam weights). For example, a one-bit phase shifter 514 may be capable of applying two phase shifts (corresponding to beam weights of, for example, 1 and −1, or i and −i). A two-bit phase shifter 514 may be capable of applying four phase shifts (using only in-phase (I) and quadrature (Q) signals, corresponding to beam weights of, for example, 1, −1, i, and −i). A three-bit phase shifter 514 may use both in-phase and quadrature signals over multiple stages of phase shifting to achieve eight different phase shifts. In some implementations, 5G chipsets may assume at least a 3-bit phase shifter 514 or at least a 5-bit phase shifter 514.

A phase shifter 514 capable of a higher resolution may be more complex than a phase shifter 514 capable of only a lower resolution. There are advantages to implementing lower-resolution phase shifters 514 and to implementing higher-resolution phase shifters 514. For example, low-resolution phase shifters consume less power and use less area on a chip than higher-resolution phase shifters, and hence can provide a competitive advantage for some designs. In particular, a B=2 bit phase shifter only uses I or Q signals (given that the beam weights are 1, i, −1 and −i) whereas a B=3 bit phase shifter uses both I and Q signals over multiple stages of phase shifting. Thus, low-resolution phase shifters may be considered for NR-Light/IoT applications to reduce cost and/or power. As another example, some radio access (e.g., 5G, 6G, etc.) systems can be designed with WiFi-designed chipsets (e.g., 802.11ad/ay, where B=2 bit resolution is often sufficient since the deployment is typically indoors). However, such low-resolution phase shifters may be associated with increased interference and stronger side lobes relative to higher-resolution phase shifters, as described in connection with FIG. 6.

FIG. 6 is a diagram illustrating examples 600 and 605 of differences between main lobe gain and side lobe gain at different phase shifter resolutions, in accordance with the present disclosure. Examples 600 and 605 are line charts in which the horizontal axis indicates a beam index and the vertical axis indicates a side lobe level. A side lobe level is a difference between a gain (e.g., a peak gain) of a main lobe and a gain (e.g., a peak gain) of a side lobe generated in connection with the generation of the main lobe. A beam may include a main lobe and zero or more side lobes. A main lobe has a highest gain of all lobes of a beam (e.g., a radiation pattern of an antenna array). A side lobe is generated by a same antenna array as the main lobe and has a lower gain than the main lobe. A side lobe is also transmitted in a different direction than a main lobe. For example, a side lobe may include a local maximum of a radiation pattern of the antenna array that is not the main lobe. As used herein, "side lobe" can also refer to a back lobe. Example 600 illustrates differences between main lobe gain and side lobe gain for an N=16 (8×2) array, whereas example 605 illustrates differences between main lobe gain and side lobe gain for an N=8 (4×2) array.

Examples 600 and 605 illustrate differences between main lobe gain and side lobe gain at different phase shifter resolutions corresponding to different values of B. In examples 600 and 605, a larger side lobe level indicates a larger difference between main lobe gain and side lobe gain. It can generally be seen that larger values of B (corresponding to higher phase shifter resolutions) lead to a larger difference between main lobe gain and side lobe gain. For example, in example 600, a value of B=4 (shown by reference number 610) and a value of B=3 (shown by reference number 615) have side lobe values that are all above approximately 10.5 dB, indicating weak side lobes. As another example, in example 605, a value of B=4 (shown by reference number 620) and a value of B=3 (shown by reference number 625) have side lobe values that are all at or above approximately 9 dB, indicating weak side lobes. However, at lower values of B (corresponding to a lower phase shift resolution), lower differences between main lobe gain and side lobe gain can occur. For example, a value of B=2 (shown by reference numbers 630 and 635) can lead to side lobe values below 7 dB in example 600 and below 6 dB in example 605.

It can be seen that, given a certain phase shifter resolution and array size, some beams have stronger side lobes than other beams. From the network's perspective (or other UEs accessing a network), a strong side lobe can cause interference, particularly in dense networks and scenarios where beams are not coordinated across cells. This side lobe based interference is particularly problematic considering the adoption of low-resolution phase shifters and small antenna arrays, which may generally cause more powerful side lobes than high-resolution phase shifters and large antenna arrays. Using a beam, at a UE, associated with a strong side lobe may cause interference and reduced efficiency of network communications.

Some techniques described herein provide selection of, and transmission using, a beam that satisfies an interference threshold for interference caused by beamforming at a UE.

The interference threshold may be based on a difference between a side lobe and a main lobe of a beam. For example, a beam that violates the interference threshold may have a side lobe with a gain (e.g., a peak gain) that is within X dB of a main lobe of the beam. The UE may select a beam from a set of beams that do not violate the interference threshold. In some aspects, the interference threshold may be signaled by a network entity. For example, the network entity may determine the interference threshold, as described elsewhere herein, and may provide an indication of the interference threshold to the UE. By transmitting using a beam that satisfies the interference threshold, interference is reduced and efficiency of network communications is improved.

FIG. 7 is a diagram illustrating an example 700 of beamforming interference mitigation signaling, in accordance with the present disclosure. Example 700 includes a UE (e.g., UE 120) and a network entity (e.g., BS 110, a CU, a DU, an RU, a combination thereof). While example 700 is described with regard to a UE, the operations of FIG. 7, FIG. 8, and other operations described herein can also be performed by other types of wireless communication devices.

As shown in FIG. 7, and by reference number 710, the network entity may output (e.g., transmit directly to the UE, or provide for transmission by another network entity), and the UE may receive, an indication of an interference threshold for interference caused by beamforming at the UE. The UE may receive the indication via radio resource control (RRC) signaling, medium access control (MAC) signaling, downlink control information (DCI), a combination thereof, or another form of signaling. In some aspects, the interference threshold may relate to a side lobe of the UE. For example, the interference caused by beamforming at the UE may be caused by a side lobe of a beam generated by the UE. Thus, the network entity may provide information regarding a tolerated side lobe level. Based on this information, the UE may limit the use of certain beams (for uplink transmission) corresponding to certain array dimensions, as described below.

In some aspects, the interference threshold indicates a threshold gain offset of a side lobe generated by the beamforming at the UE. For example, the threshold gain offset may identify a minimum difference between a gain (e.g., a peak gain) of a main lobe of a beam of the UE and a gain (e.g., a peak gain) of a side lobe (e.g., a strongest side lobe) of the beam of the UE. A beam that satisfies the interference threshold may have a side lobe with a gain (e.g., a peak gain) that is, at most, lower than a gain (e.g., a peak gain) of a main lobe of the beam by the threshold gain offset. Thus, a beam that satisfies the interference threshold may have a strongest side lobe that is weaker than the main lobe by at least the threshold gain offset. A beam that violates the interference threshold may have a strongest side lobe that is weaker than the main lobe by less than the threshold gain offset. By using beams that satisfy the interference threshold, interference due to side lobes is reduced. Conversely, using beams that violate the interference threshold may cause interference due to transmission in directions other than a direction of the main lobe at a high gain.

In some aspects, the network entity may identify the interference threshold. For example, the network entity may receive, from a UE or another network entity, information indicating interference associated with a side lobe. In some aspects, the information may identify a beam (e.g., based on a beamformed reference signal such as a synchronization signal block, channel state information reference signal, or sounding reference signal) that causes the interference. In some aspects, the network entity may identify the interference threshold based on a densification of a network of the network entity. For example, the network entity may dynamically modify the interference threshold (e.g., a tolerated side lobe level) based on a densification parameter (which may indicate a density of UEs, network entities, or the like within a network or a given area). The network entity may increase the interference threshold (e.g., use a larger threshold gain offset) for a more dense network (for example, a network with a larger number of active devices or a larger amount of interference), or may decrease the interference threshold (e.g., use a smaller threshold gain offset) for a less dense network (e.g., a network with a smaller number of active devices or a smaller amount of interference).

As shown by reference number 720, in some aspects, the UE may select a beam based at least in part on the interference threshold. For example, the UE may have access to information indicating beams that satisfy a given interference threshold. As an example, consider example 600 of FIG. 6 and a UE with a 3-bit phase shifter (as indicated by the square points of the line chart of example 600). If the interference threshold is configured with a threshold gain offset of 11 dB, then the beams that satisfy the interference threshold may include beam indexes 1, 2, 3, 4, 7, and 8. In this example, the UE may select a beam for transmission from beams corresponding to (e.g., satisfying) the interference threshold, which may include beam indexes 1, 2, 3, 4, 7, and 8. In some aspects, the UE may select a beam at a given array dimension (e.g., a given value of N or a given arrangement of antenna elements).

In some aspects, the UE may select the beam based at least in part on a minimum number of antenna elements. For example, as described with regard to FIG. 6, a beam generated using a smaller number of antenna elements is generally associated with stronger side lobes than a beam generated using a larger number of antenna elements. An interference threshold may be associated with (e.g., mapped to) a minimum number of antenna elements, such that all beams (or a certain number of beams) generated using at least the minimum number of antenna elements satisfy the interference threshold. For example, consider examples 600 and 605 of FIG. 6, a 3-bit phase shifter, and an interference threshold with a threshold gain offset of 10 dB. In this example, if N=8 (4×2) antenna elements are used as shown in example 605, beam indexes 2 and 4 are unusable due to the corresponding beams violating the interference threshold. In this example, a minimum of 16 antenna elements (as in example 600) ensures that, with 3-bit phase shifters, no beam violates the interference threshold. For example, a set of beams generated using 16 antenna elements and 3-bit phase shifters may include beam indexes 1-8 of example 600. In this example, the UE may identify a minimum number of antenna elements to be 16 antenna elements. Thus, the set of beams including beam indexes 1-8 may correspond to the interference threshold in that the set of beams are generated using a minimum number of antenna elements (e.g., 16 antenna elements), where the minimum number of antenna elements corresponds to the interference threshold. Thus, the UE may lower bound an array dimension at the UE (that is, the UE may not allow arbitrarily low array dimensions).

A correspondence between a given interference threshold (or a range of interference thresholds) and a minimum number of antennas may be configured, determined by the UE, preconfigured (e.g., by a manufacturer or network operator of the UE), or the like. As just one example, the correspondence may indicate that interference thresholds with threshold gain offsets between 9 dB and 11 dB are associated with a minimum of 16 antenna elements, and interference thresholds with threshold gain offsets between 6 dB and 9 dB are associated with a minimum of 8 antenna elements.

A beam may be defined by a beamformed reference signal corresponding to the beam. For example, the beamformed reference signal may include a synchronization signal block (SSB), a channel state information reference signal (CSI-RS), a sounding reference signal (SRS), or another form of reference signal. An SSB may be identified by an SSB index, a CSI-RS may be identified by a CSI-RS index, and an SRS may be identified by an SRS index. A beam generated using a same transmission configuration indication (TCI) state (e.g., a same set of spatial properties) as a beamformed reference signal may be defined by the beamformed reference signal, and may be identified by an index of the beamformed reference signal. Thus, the UE and the network node can communicate information regarding a specific beam by communicating information indicating an index of a beamformed reference signal that defines the specific beam. At a given array dimension (e.g., a viable array dimension for a certain interference threshold), the UE may limit certain beams that can be used over SSBs, CSI-RSs, and/or SRSs, such as by selecting a beam that satisfies the certain interference threshold from a set of beams defined by SSBs, CSI-RSs, and/or SRSs, where each of the set of beams satisfies the certain interference threshold.

In some aspects, the UE may receive information indicating that a beam satisfies an interference threshold. In some aspects, the UE may receive information indicating that a beam violates an interference threshold. For example, the UE may receive such information from another UE (e.g., a UE experiencing interference from a side lobe of a beam), a network entity (e.g., the network entity of FIG. 7 or another network entity), or the like. In some aspects, the UE may be preconfigured with information indicating that a beam satisfies an interference threshold or violates an interference threshold, such as by a manufacturer or network operator of the UE. In some aspects, a UE may be configured with a table that indicates interference thresholds and corresponding beams that violate (or satisfy) the interference thresholds.

By implementing an interference threshold that can be dynamically modified (for example, based on a densification of a network at a given time), the beams usable by a UE can be limited in accordance with a current interference threshold of the UE. Thus, the choice of beams that may be disallowed for the UE can be dynamically controlled.

As shown by reference number 730, the UE may transmit signaling using a beam that satisfies the interference threshold. In some aspects, the network entity may communicate with the UE using the beam. For example, the network entity may receive communications that are transmitted via the beam. For example, the UE may select the beam from a set of beams corresponding to the interference threshold (e.g., from a set of beams using at least a minimum number of antenna elements corresponding to the interference threshold and/or defined by an SSB index, CSI-RS index, or SRS index that is not disallowed for the interference threshold). The signaling may include data, control information, a reference signal, or another form of transmission.

As shown by reference number 740, in some aspects, the UE may transmit, and the network entity may obtain (e.g., receive directly from the UE or receive via another network entity), information indicating beams that violate the interference threshold at the UE. For example, the UE may transmit information indicating one or more beamformed reference signals (e.g., one or more SSB indexes, CSI-RS indexes, and/or SRS indexes) corresponding to one or more beams that violate the interference threshold at the UE. The UE may identify the one or more beams that violate the interference threshold based on information stored at the UE (e.g., information indicating a gain offset between a main lobe and a side lobe of a beam), information received from a network entity (e.g., indicating that a beam or a side lobe of a beam is associated with a threshold level of interference), or the like. In some aspects, the information indicating the one or more beamformed reference signals may indicate an SSB index or a TCI state. For example, the SSB index or the TCI state may correspond to (e.g., define) a beam that violates the interference threshold. The UE may provide this information in accordance with an interference threshold signaled by the network node (such as at reference number 710) or in the absence of the interference threshold. For example, the UE may transmit information indicating one or more beams that are associated with a low gain offset, irrespective of whether the UE has been configured with an interference threshold.

As shown by reference number 750, in some aspects, the network node may output, and the UE may receive, an indication (e.g., a beam switching message) to switch to a beam based at least in part on the information indicating the one or more beamformed reference signals. For example, the indication may cause the UE to switch from a beam defined by one of the one or more beamformed reference signals, to a beam that satisfies the interference threshold (e.g., the beam described with regard to reference number 730). The signaling indicated by reference numbers 740 and 750 can, in some examples, occur prior to the communication shown by reference number 730. Additionally, or alternatively, the signaling indicated by reference numbers 740 and 750 can occur after the communication shown by reference number 730.

As shown by reference number 760, in some aspects, the network entity may output, and the UE may receive, a configuration of a set of beamformed reference signals based at least in part on the information indicating the one or more beamformed reference signals (shown by reference number 740). For example, the set of beamformed reference signals may exclude the one or more beamformed reference signals, such that the UE is unlikely to select a beam that violates the interference threshold.

As indicated above, FIG. 7 is provided as an example. Other examples may differ from what is described with regard to FIG. 7.

Figure 8:
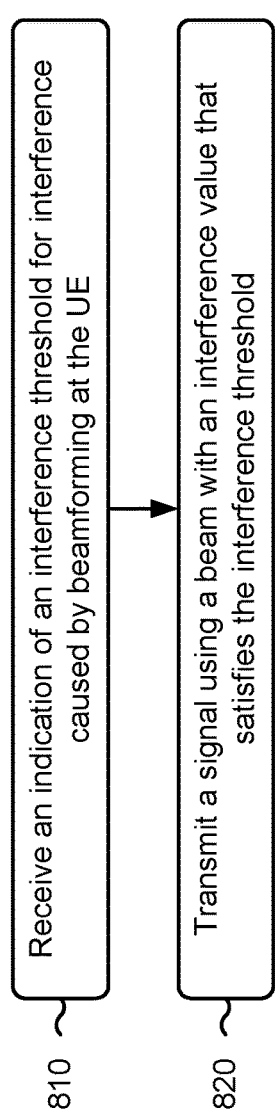
FIG. 8 shows a method for wireless communications by a UE, in accordance with the present disclosure.

FIG. 8 shows a method 800 for wireless communications by a UE, such as UE 120.

Method 800 begins at 810 with receiving an indication of an interference threshold for interference caused by beamforming at the UE.

Method 800 then proceeds to step 820 with transmitting a signal using a beam with an interference value that satisfies the interference threshold.

In a first aspect, the interference threshold indicates a threshold gain offset of a side lobe generated by the beamforming at the UE.

In a second aspect, alone or in combination with the first aspect, a side lobe of the beam with the interference value that satisfies the interference threshold has a first gain, a main lobe of the beam has a second gain, and the interference value satisfies the interference threshold due to the first gain being lower than the second gain by at least the interference threshold.

In a third aspect, alone or in combination with one or more of the first and second aspects, transmitting using the beam further comprises transmitting using at least a minimum number of antenna elements based at least in part on the interference threshold.

In a fourth aspect, alone or in combination with one or more of the first through third aspects, method 800 includes selecting, from a set of beams corresponding to the interference threshold, the beam.

In a fifth aspect, alone or in combination with one or more of the first through fourth aspects, the set of beams correspond to the interference threshold based on the set of beams being generated using a minimum number of antenna elements corresponding to the interference threshold.

In a sixth aspect, alone or in combination with one or more of the first through fifth aspects, the set of beams comprises at least one of one or more beams defined by a synchronization signal block index, one or more beams defined by a channel state information reference signal index, or one or more beams defined by a sounding reference signal index.

In a seventh aspect, alone or in combination with one or more of the first through sixth aspects, method 800 includes transmitting information indicating one or more beamformed reference signals corresponding to one or more beams that violate the interference threshold at the UE.

In an eighth aspect, alone or in combination with one or more of the first through seventh aspects, method 800 includes receiving an indication to switch to the beam based at least in part on the information indicating the one or more beamformed reference signals.

In a ninth aspect, alone or in combination with one or more of the first through eighth aspects, method 800 includes receiving a configuration of a set of beamformed reference signals based at least in part on the information indicating the one or more beamformed reference signals.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are consistent with this disclosure.

Figure 9:
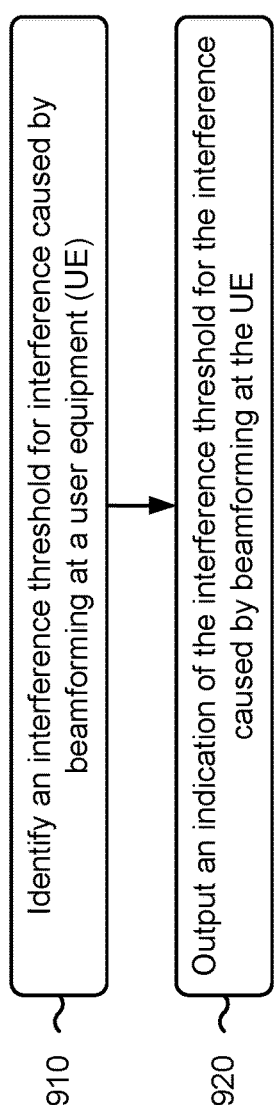
FIG. 9 shows a method for wireless communications by a network entity, in accordance with the present disclosure.

FIG. 9 shows a method 900 for wireless communications by a network entity, such as BS 110, or a disaggregated base station as discussed with respect to FIG. 3.

Method 900 begins at 910 with identifying an interference threshold for interference caused by beamforming at a UE.

Method 900 then proceeds to step 920 with outputting an indication of the interference threshold for the interference caused by beamforming at the UE.

In a first aspect, the interference threshold indicates a threshold gain offset of a side lobe generated by the beamforming at the UE.

In a second aspect, alone or in combination with the first aspect, a side lobe of the beam with the interference value that satisfies the interference threshold has a first gain, a main lobe of the beam has a second gain, and the interference value satisfies the interference threshold due to the first gain being lower than the second gain by at least the interference threshold.

In a third aspect, alone or in combination with one or more of the first and second aspects, method 900 includes obtaining, prior to outputting the indication, information indicating one or more beamformed reference signals corresponding to one or more beams that violate the interference threshold at the UE, wherein identifying the interference threshold is based at least in part on the one or more beamformed reference signals.

In a fourth aspect, alone or in combination with one or more of the first through third aspects, method 900 includes outputting an indication to switch to a beam based at least in part on the information indicating the one or more beamformed reference signals.

In a fifth aspect, alone or in combination with one or more of the first through fourth aspects, method 900 includes outputting a configuration of a set of beamformed reference signals based at least in part on the information indicating the one or more beamformed reference signals.

In a sixth aspect, alone or in combination with one or more of the first through fifth aspects, method 900 includes communicating with the UE using a beam that is associated with an interference value that satisfies the interference threshold.

In a seventh aspect, alone or in combination with one or more of the first through sixth aspects, identifying the interference threshold further comprises identifying the interference threshold using information indicating one or more beamformed reference signals corresponding to one or more beams that violate the interference threshold, wherein the information is received from the UE or another network node.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are consistent with this disclosure.

FIG. 10 depicts aspects of an example communications device 1000. In some aspects, communications device 1000 is a UE, such as UE 120.

The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes one or more processors 1020. In various aspects, the one or more processors 1020 may be representative of one or more of receive processor 258, transmit processor 264, TX MIMO processor 266, and/or controller/processor 280, as described with respect to FIG. 2. The one or more processors 1020 are coupled to a computer-readable medium/memory 1030 via a bus 1006. In certain aspects, the computer-readable medium/memory 1030 is configured to store instructions (e.g., computer-executable code) that when executed by the one or more processors 1020, cause the one or more processors 1020 to perform the method 800 described with respect to FIG. 8, or any aspect related to it. Note that reference to a processor performing a function of communications device 1000 may include one or more processors performing that function of communications device 1000.

In the depicted example, computer-readable medium/memory 1030 stores code (e.g., executable instructions)

1031 for receiving an indication of an interference threshold for interference caused by beamforming at the UE, code 1032 for transmitting a signal using a beam with an interference value that satisfies the interference threshold, code 1033 for selecting, from a set of beams corresponding to the interference threshold, the beam, and code 1034 for transmitting information indicating one or more beamformed reference signals corresponding to one or more beams that violate the interference threshold at the UE. Processing of the code 1031-1034 may cause the communications device 1000 to perform the method 800 described with respect to FIG. 8, or any aspect related to it.

The one or more processors 1020 include circuitry configured to implement (e.g., execute) the code stored in the computer-readable medium/memory 1030, including circuitry 1021 for receiving an indication of an interference threshold for interference caused by beamforming at the UE, circuitry 1022 for transmitting a signal using a beam with an interference value that satisfies the interference threshold, circuitry 1023 for selecting, from a set of beams corresponding to the interference threshold, the beam, and circuitry 1024 for transmitting information indicating one or more beamformed reference signals corresponding to one or more beams that violate the interference threshold at the UE. Processing with circuitry 1021-1024 may cause the communications device 1000 to perform the method 800 described with respect to FIG. 8, or any aspect related to it.

Various components of the communications device 1000 may provide means for performing the method 800 described with respect to FIG. 8, or any aspect related to it. For example, means for transmitting, sending, or outputting for transmission may include the transceivers 254 and/or antenna(s) 252 of the UE 120 and/or transceiver 1008 and antenna 1010 of the communications device 1000 in FIG. 10. Means for receiving or obtaining may include the transceivers 254 and/or antenna(s) 252 of the UE 120 and/or transceiver 1008 and antenna 1010 of the communications device 1000 in FIG. 10.

FIG. 11 depicts aspects of an example communications device. In some aspects, communications device 1100 is a network entity, such as BS 110, or a disaggregated base station as discussed with respect to FIG. 3.

The communications device 1100 includes a processing system 1102 coupled to a transceiver 1108 (e.g., a transmitter and/or a receiver) and/or a network interface 1112. The transceiver 1108 is configured to transmit and receive signals for the communications device 1100 via an antenna 1110, such as the various signals as described herein. The network interface 1112 is configured to obtain and send signals for the communications device 1100 via communications link(s), such as a backhaul link, midhaul link, and/or fronthaul link as described herein, such as with respect to FIG. 3. The processing system 1102 may be configured to perform processing functions for the communications device 1100, including processing signals received and/or to be transmitted by the communications device 1100.

The processing system 1102 includes one or more processors 1120. In various aspects, one or more processors 1120 may be representative of one or more of receive processor 238, transmit processor 220, TX MIMO processor 230, and/or controller/processor 240, as described with respect to FIG. 2. The one or more processors 1120 are coupled to a computer-readable medium/memory 1130 via a bus 1106. In certain aspects, the computer-readable medium/memory 1130 is configured to store instructions (e.g., computer-executable code) that when executed by the one or more processors 1120, cause the one or more processors 1120 to perform the method 900 described with respect to FIG. 9, or any aspect related to it. Note that reference to a processor of communications device 1100 performing a function may include one or more processors of communications device 1100 performing that function.

In the depicted example, the computer-readable medium/memory 1130 stores code 1131 (e.g., executable instructions) for identifying an interference threshold for interference caused by beamforming at a UE, code 1132 for outputting an indication of the interference threshold for the interference caused by beamforming at the UE, and code 1133 for obtaining, prior to outputting the indication, information indicating one or more beamformed reference signals corresponding to one or more beams that violate the interference threshold at the UE. Processing of the code 1131-1133 may cause the communications device 1100 to perform the method 900 described with respect to FIG. 9, or any aspect related to it.

The one or more processors 1120 include circuitry configured to implement (e.g., execute) the code stored in the computer-readable medium/memory 1130, including circuitry 1121 for identifying an interference threshold for interference caused by beamforming at a UE, circuitry 1122 for outputting an indication of the interference threshold for the interference caused by beamforming at the UE, and circuitry 1123 for obtaining, prior to outputting the indication, information indicating one or more beamformed reference signals corresponding to one or more beams that violate the interference threshold at the UE. Processing with circuitry 1121-1123 may cause the communications device 1100 to perform the method 900 as described with respect to FIG. 9, or any aspect related to it.

Various components of the communications device 1100 may provide means for performing the method 900 as described with respect to FIG. 9, or any aspect related to it. Means for transmitting, sending, or outputting for transmission may include the transceivers 232 and/or antenna(s) 234 of the BS 110 and/or transceiver 1108 and antenna 1110 of the communications device 1100 in FIG. 11. Means for receiving or obtaining may include the transceivers 232 and/or antenna(s) 234 of the BS 110 and/or transceiver 1108 and antenna 1110 of the communications device 1100 in FIG. 11.

The following provides an overview of some Aspects of the present disclosure:

Aspect 1: A method of wireless communication performed by a user equipment (UE), comprising: receiving an indication of an interference threshold for interference caused by beamforming at the UE; and transmitting a signal using a beam with an interference value that satisfies the interference threshold.

Aspect 2: The method of Aspect 1, wherein the interference threshold indicates a threshold gain offset of a side lobe generated by the beamforming at the UE.

Aspect 3: The method of any of Aspects 1-2, wherein a side lobe of the beam with the interference value that satisfies the interference threshold has a first gain, a main lobe of the beam has a second gain, and the interference value satisfies the interference threshold due to the first gain being lower than the second gain by at least the interference threshold.

Aspect 4: The method of any of Aspects 1-3, wherein transmitting using the beam further comprises transmitting using at least a minimum number of antenna elements based at least in part on the interference threshold.

Aspect 5: The method of any of Aspects 1-4, further comprising selecting, from a set of beams corresponding to the interference threshold, the beam.

Aspect 6: The method of Aspect 5, wherein the set of beams correspond to the interference threshold based on the set of beams being generated using a minimum number of antenna elements corresponding to the interference threshold.

Aspect 7: The method of Aspect 5, wherein the set of beams comprise at least one of: one or more beams defined by a synchronization signal block index, one or more beams defined by a channel state information reference signal index, or one or more beams defined by a sounding reference signal index.

Aspect 8: The method of any of Aspects 1-7, further comprising: transmitting information indicating one or more beamformed reference signals corresponding to one or more beams that violate the interference threshold at the UE.

Aspect 9: The method of Aspect 8, further comprising receiving an indication to switch to the beam based at least in part on the information indicating the one or more beamformed reference signals.

Aspect 10: The method of Aspect 8, further comprising receiving a configuration of a set of beamformed reference signals based at least in part on the information indicating the one or more beamformed reference signals.

Aspect 11: A method of wireless communication performed by a network entity, comprising: identifying an interference threshold for interference caused by beamforming at a user equipment (UE); and outputting an indication of the interference threshold for the interference caused by beamforming at the UE.

Aspect 12: The method of Aspect 11, wherein the interference threshold indicates a threshold gain offset of a side lobe generated by the beamforming at the UE.

Aspect 13: The method of any of Aspects 11-12, wherein a side lobe of the beam with the interference value that satisfies the interference threshold has a first gain, a main lobe of the beam has a second gain, and the interference value satisfies the interference threshold due to the first gain being lower than the second gain by at least the interference threshold.

Aspect 14: The method of any of Aspects 11-13, further comprising: obtaining, prior to outputting the indication, information indicating one or more beamformed reference signals corresponding to one or more beams that violate the interference threshold at the UE, wherein identifying the interference threshold is based at least in part on the one or more beamformed reference signals.

Aspect 15: The method of any of Aspects 11-14, further comprising outputting an indication to switch to a beam based at least in part on the information indicating the one or more beamformed reference signals.

Aspect 16: The method of any of Aspects 11-15, further comprising outputting a configuration of a set of beamformed reference signals based at least in part on the information indicating the one or more beamformed reference signals.

Aspect 17: The method of any of Aspects 11-16, further comprising communicating with the UE using a beam that is associated with an interference value that satisfies the interference threshold.

Aspect 18: The method of any of Aspects 11-17, wherein identifying the interference threshold further comprises identifying the interference threshold using information indicating one or more beamformed reference signals corresponding to one or more beams that violate the interference threshold, wherein the information is received from the UE or another network node.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:
1. A method of wireless communication performed by a user equipment (UE), comprising:
    receiving an indication of an interference threshold for interference caused by a side lobe generated by beamforming at the UE; and
    transmitting a signal using a beam with an interference value that satisfies the interference threshold,
    wherein the interference threshold indicates a threshold gain offset of the side lobe generated by the beamforming at the UE.
2. A method of wireless communication performed by a user equipment (UE), comprising:
    receiving an indication of an interference threshold for interference caused by a side lobe generated by beamforming at the UE; and
    transmitting a signal using a beam with an interference value that satisfies the interference threshold,
    wherein a side lobe of the beam with the interference value that satisfies the interference threshold has a first gain, a main lobe of the beam has a second gain, and the interference value satisfies the interference threshold due to the first gain being lower than the second gain by at least the interference threshold.

3. The method of claim 1, wherein transmitting using the beam further comprises transmitting using at least a minimum number of antenna elements based at least in part on the interference threshold.

4. The method of claim 1, further comprising selecting, from a set of beams corresponding to the interference threshold, the beam.

5. The method of claim 4, wherein;

the set of beams correspond to the interference threshold based on the set of beams being generated using a minimum number of antenna elements corresponding to the interference threshold; or the set of beams comprise at least one of one or more beams defined by a synchronization signal block index, one or more beams defined by a channel state information reference signal index, or one or more beams defined by a sounding reference signal index.

6. The method of claim 1, further comprising: transmitting information indicating one or more beamformed reference signals corresponding to one or more beams that violate the interference threshold at the UE.

7. A method of wireless communication performed by a network entity, comprising:

identifying an interference threshold for interference caused by beamforming at a user equipment (UE); and outputting an indication of the interference threshold for the interference caused by beamforming at the UE.

8. A user equipment (UE) for wireless communication, comprising one or more processors, coupled to memory, and configured to cause the UE to:

receive an indication of an interference threshold for interference caused by a side lobe generated by beamforming at the UE; and transmit a signal using a beam with an interference value that satisfies the interference threshold, wherein the interference threshold indicates a threshold gain offset of the side lobe generated by the beamforming at the UE.

9. A network entity for wireless communication, comprising one or more processors, coupled to memory, and configured to cause the network entity to:

identify an interference threshold for interference caused by beamforming at a user equipment (UE); and output an indication of the interference threshold for the interference caused by beamforming at the UE.

10. A user equipment (UE) for wireless communication, comprising one or more processors, coupled to memory, and configured to cause the UE to:

receive an indication of an interference threshold for interference caused by a side lobe generated by beamforming at the UE; and transmit a signal using a beam with an interference value that satisfies the interference threshold, wherein a side lobe of the beam with the interference value that satisfies the interference threshold has a first gain, a main lobe of the beam has a second gain, and the interference value satisfies the interference threshold due to the first gain being lower than the second gain by at least the interference threshold.

11. The UE of claim 8, wherein to transmit using the beam, the one or more processors are further configured to cause the UE to transmit using at least a minimum number of antenna elements based at least in part on the interference threshold.

12. The UE of claim 8, wherein the one or more processors are further configured to cause the UE to select, from a set of beams corresponding to the interference threshold, the beam.

13. The UE of claim 12, wherein:

the set of beams correspond to the interference threshold based on the set of beams being generated using a minimum number of antenna elements corresponding to the interference threshold; or the set of beams comprise at least one of: one or more beams defined by a synchronization signal block index, one or more beams defined by a channel state information reference signal index, or one or more beams defined by a sounding reference signal index.

14. The UE of claim 8, wherein the one or more processors are further configured to cause the UE to: transmit information indicating one or more beamformed reference signals corresponding to one or more beams that violate the interference threshold at the UE.

15. The UE of claim 14, wherein the one or more processors are further configured to cause the UE to; receive an indication to switch to the beam based at least in part on the information indicating the one or more beamformed reference signals; or wherein the one or more processors are further configured to receive a configuration of a set of beamformed reference signals based at least in part on the information indicating the one or more beamformed reference signals.

16. The method of claim 6, wherein the method further comprises: receiving an indication to switch to the beam based at least in part on the information indicating the one or more beamformed reference signals; or receiving a configuration of a set of beamformed reference signals based at least in part on the information indicating the one or more beamformed reference signals.

17. The method of claim 7, wherein the interference threshold indicates a threshold gain offset of the side lobe generated by the beamforming at the UE.

18. The network entity of claim 9, wherein the interference threshold indicates a threshold gain offset of the side lobe generated by the beamforming at the UE.

* * * * *